US00RE48710E

(19) United States
(12) Reissued Patent
Sundaram

(10) Patent Number: US RE48,710 E
(45) Date of Reissued Patent: Aug. 31, 2021

(54) SHORT REVERSIBLE DRESSES

(71) Applicant: Durgamritha Thayammal Sundaram, Long Island City, NY (US)

(72) Inventor: Durgamritha Thayammal Sundaram, Long Island City, NY (US)

(21) Appl. No.: 16/661,706

(22) Filed: Oct. 23, 2019

Related U.S. Patent Documents

Reissue of:
(64) Patent No.: 9,526,281
Issued: Dec. 27, 2016
Appl. No.: 15/163,764
Filed: May 25, 2016

U.S. Applications:
(62) Division of application No. 14/095,615, filed on Dec. 3, 2013, now Pat. No. 9,445,634.

(60) Provisional application No. 61/733,073, filed on Dec. 4, 2012.

(51) Int. Cl.
*A41D 15/00* (2006.01)
*A41D 1/22* (2018.01)

(52) U.S. Cl.
CPC ..... *A41D 15/005* (2013.01); *A41D 1/22* (2013.01); *A41D 15/002* (2013.01)

(58) Field of Classification Search
CPC ..... A41D 15/005; A41D 1/22; A41D 15/002; A41D 15/00
See application file for complete search history.

(56) References Cited

U.S. PATENT DOCUMENTS 529,828 A * 11/1894 Geldowsky ..... A41D 1/14 2/211
546,496 A * 9/1895 Peck ..... A41D 1/14 2/211
624,114 A * 5/1899 Stears ..... A41D 27/12 2/47
838,922 A * 12/1906 Vernon ..... A41D 1/14 2/211
1,065,310 A * 6/1913 Goldschmidt et al. ..... A41D 5/006 2/65
1,228,807 A * 6/1917 Moscow ..... A41D 1/14 2/211
1,430,715 A 10/1922 Zitting
1,630,838 A 5/1927 Dryer
1,726,951 A 9/1929 Evanove
1,841,474 A 1/1932 Greenwich
2,091,122 A 8/1937 Margulius
2,136,974 A 11/1938 Kanovitz
2,138,041 A 11/1938 Preston
2,277,492 A 3/1942 Kamhi
2,777,492 A 3/1942 Kamhi
2,375,562 A 5/1945 Kaufmann
(Continued)

FOREIGN PATENT DOCUMENTS

GB 990961 * 5/1965

*Primary Examiner* — Catherine S Williams
(74) *Attorney, Agent, or Firm* — Law Offices of Leo Mikityanskiy, P.C.; Leonid Mikityanskiy

(57) ABSTRACT

A reversible bridesmaid dress or evening dress with a hem facing that allows the dress to have one color or pattern on one side and another color or pattern on the other side. When the dress is flipped inside out, it has a completely different appearance than on the other side. The reversible dress can come in a variety of different shapes, types and sizes. Dresses of different colors may be created from a single reversible dress.

10 Claims, 12 Drawing Sheets

(56) References Cited

U.S. PATENT DOCUMENTS

| | | | | | |
|---|---|---|---|---|---|
| 2,412,988 | A | | 12/1946 | Kleinman | |
| 2,498,332 | A | | 2/1950 | Brick | |
| 2,515,089 | A | | 7/1950 | Kamhi | |
| 2,629,101 | A | * | 2/1953 | Greenwald | A41B 13/00 2/204 |
| 2,635,244 | A | * | 4/1953 | Lewis | A41B 13/00 2/211 |
| 2,711,539 | A | | 6/1955 | Loscher | |
| 2,713,685 | A | * | 7/1955 | Nachem | A41D 1/06 112/424 |
| 2,717,395 | A | * | 9/1955 | Holshouser | A41D 27/24 112/425 |
| 2,743,450 | A | | 5/1956 | Kling | |
| 2,791,779 | A | | 5/1957 | Presson | |
| 2,851,691 | A | * | 9/1958 | Todd | A41B 9/10 2/211 |
| 2,912,698 | A | | 11/1959 | Greenblatt | |
| 3,064,265 | A | * | 11/1962 | Bridgewaters | A41D 15/002 2/105 |
| 3,261,024 | A | | 7/1966 | Delaney | |
| 3,296,628 | A | | 1/1967 | Collins | |
| 3,495,274 | A | | 2/1970 | Isaacs | |
| 3,574,237 | A | | 4/1971 | Reynolds | |
| 3,665,516 | A | * | 5/1972 | Orovan | A41D 27/24 2/211 |
| 4,296,498 | A | | 10/1981 | Vinson | |
| 4,377,007 | A | * | 3/1983 | Sudjian | A41D 15/002 2/105 |
| 4,662,008 | A | | 5/1987 | Weiser | |
| 4,686,714 | A | | 8/1987 | Harley | |
| 4,774,726 | A | * | 10/1988 | Garrett | A41D 1/22 2/105 |
| 5,029,344 | A | | 7/1991 | Shannon et al. | |
| 5,566,393 | A | | 10/1996 | Best | |
| D430,385 | S | | 9/2000 | Hosogai | |
| D454,245 | S | | 3/2002 | Logan | |
| D503,513 | S | | 4/2005 | McCarthy | |
| 2011/0185470 | A1 | | 8/2011 | Jones | |

* cited by examiner

SHORT REVERSIBLE DRESSES

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE OF RELATED APPLICATIONS

*This reissue application is a reissue of U.S. patent application Ser. No. 15,163,764, filed May 25, 2016, which issued as U.S. Pat. No. 9,526,281.* This [patent] *reissue* application *claims priority to patent application Ser. No. 15,163,764, which* is a divisional application of nonprovisional patent application Ser. No. 14/095,615, filed on Dec. 3, 2013, which is a nonprovisional application of, and claims priority to provisional patent application Ser. No. 61/733,073 filed on Dec. 4, 2012, all of which are hereby incorporated by reference in their entirety.

FIELD OF THE INVENTION

The present invention relates generally to reversible dresses and a method for creating a reversible dress. More specifically, the present invention is for reversible bridesmaids' dresses and a method for creating a reversible bridesmaid dress.

This invention was not made pursuant to any federally-sponsored research and/or development.

BACKGROUND

Reversible garments are well-known in the art. A number of reversible dresses, jackets, children's clothing and the like have been designed and produced. However, no reversible bridesmaids' dresses are known because of the difficulties typically associated with producing a reversible bridesmaid dress because of dress color issues, length issues and the difficulty of producing a dress hem that does not have bits of either color peeking through. The problem with the current methods is that there is no factory-produced hem that is easy to produce, which can ensure that bits of the other color are not peeking through. A typical factory-produced hem becomes uneven and difficult to sew without the method disclosed as the present invention. What is needed is a reversible bridesmaid dress that allows the change of a color and length of a dress after it is used as a bridesmaid dress. Such a reversible dress and a method for creation of the dress are provided.

A wedding is a time where people can dress up nicely and celebrate a marriage between two people. Oftentimes at a wedding, there will be bridesmaids to help the bride. The bridesmaids will have to go through a few different types of dresses depending on the different events throughout the day of the wedding. However, bridesmaids' dresses are typically color-coordinated, and are frequently not usable outside of the particular wedding they are purchased for because of a particular style and color. Typically, the bridesmaids will have to spend money on a bridesmaid dress only to have no use for it later and have to let it collect dust after just one wedding. A similar problem exists for evening dresses and gowns that are color and length-coordinated for particular events, but may have no use outside of these events. It is therefore an object of the present invention to introduce a reversible bridesmaid dress and a method for creation therefor.

SUMMARY OF THE INVENTION

The present invention is a reversible bridesmaid dress and a method for the creation of a reversible bridesmaid dress with a hem facing that allows the dress to have one color on one side and another color on the other side. Hence, when the dress is flipped inside out, it looks completely different than when it was on the other side. The present invention can come in a variety of different types and sizes. The long dresses can bubble up to short ones as well creating two color and length dresses.

The long dress (the colored side) preferably has hidden attachment means, such as buttons, at the waistband. On the other side (black side) of the dress, there are hidden button loops that are at the hem that allow the user to button up the bottom of the dress to form a bubble dress when it is flipped over to the other side (black side). This creates a long colored dress that someone can wear as a short black dress on the other side. When the wearer wants to convert the long evening gown or bridesmaid dress into a short dress, the user attaches the buttons at the waistband to the loops at the hem (bottom) of the dress on the long (usually colored) side. This reduces the length of the dress' skirt by half, as measured from the waistband. The user then reverses the buttoned-up dress, or, in other words, flips it inside out to change colors.

An alternative embodiment of the present invention is a short reversible dress that allows the users to get two different color dresses in one. The dress is manufactured using two different layers of fabric, having two different colors or design patterns. The fabric on one side of the garment is patterned and sewn to be a little longer than the other, thus creating a two tier effect on one side (the side with the shorter fabric). The hem facing on the longer side helps create a dress that is completely reversible and does not show the inside color of the garment when being worn longer-side-out. The wearers of the dress and the external observers cannot tell that the dress is reversible or that the dress is of two different colors, each of which is wearable independently of the other, because the inside fabric does not peek through the hem because of the special hem facing. The hem facing present on the longer side is in the same color as the body of the dress (the shorter side), so the external observers cannot see the inside fabric. All the external observers see is the two-tier bottom of the dress. If desirable, a multi-tier effect can be accomplished using the method and reversible dress of the present invention, while still maintaining the reversibility of the dress.

BRIEF DESCRIPTION OF THE DRAWINGS

All illustrations of the drawings are for the purpose of describing selected versions of the present invention and are not intended to limit the scope of the present invention. The features, aspects and advantages of the novel reversible dresses will become further understood with reference to the following description and accompanying drawings where.

DESCRIPTION

Figure 1:
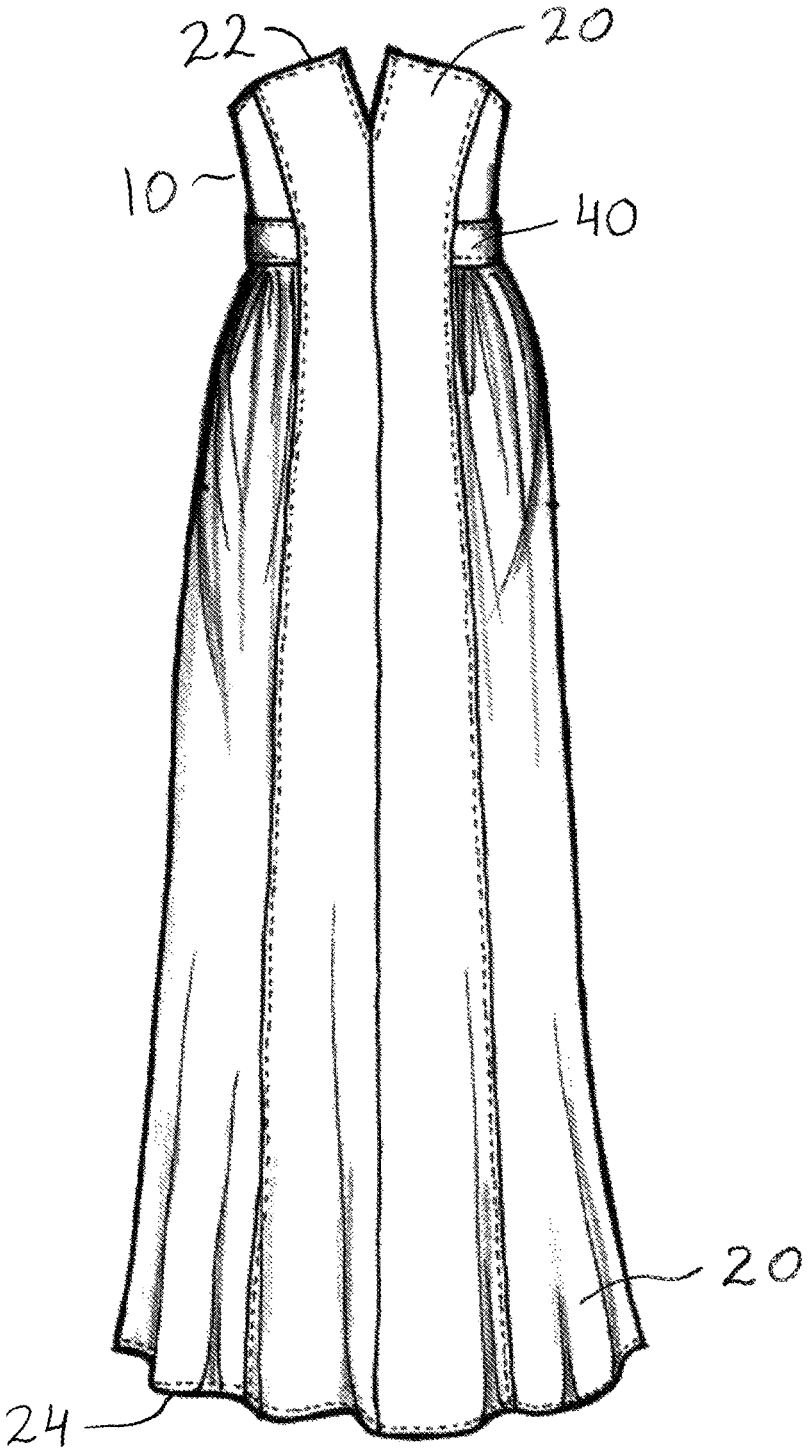
FIG. 1 is a front view of a colored side of the long dress of the present invention.
Figure 2:
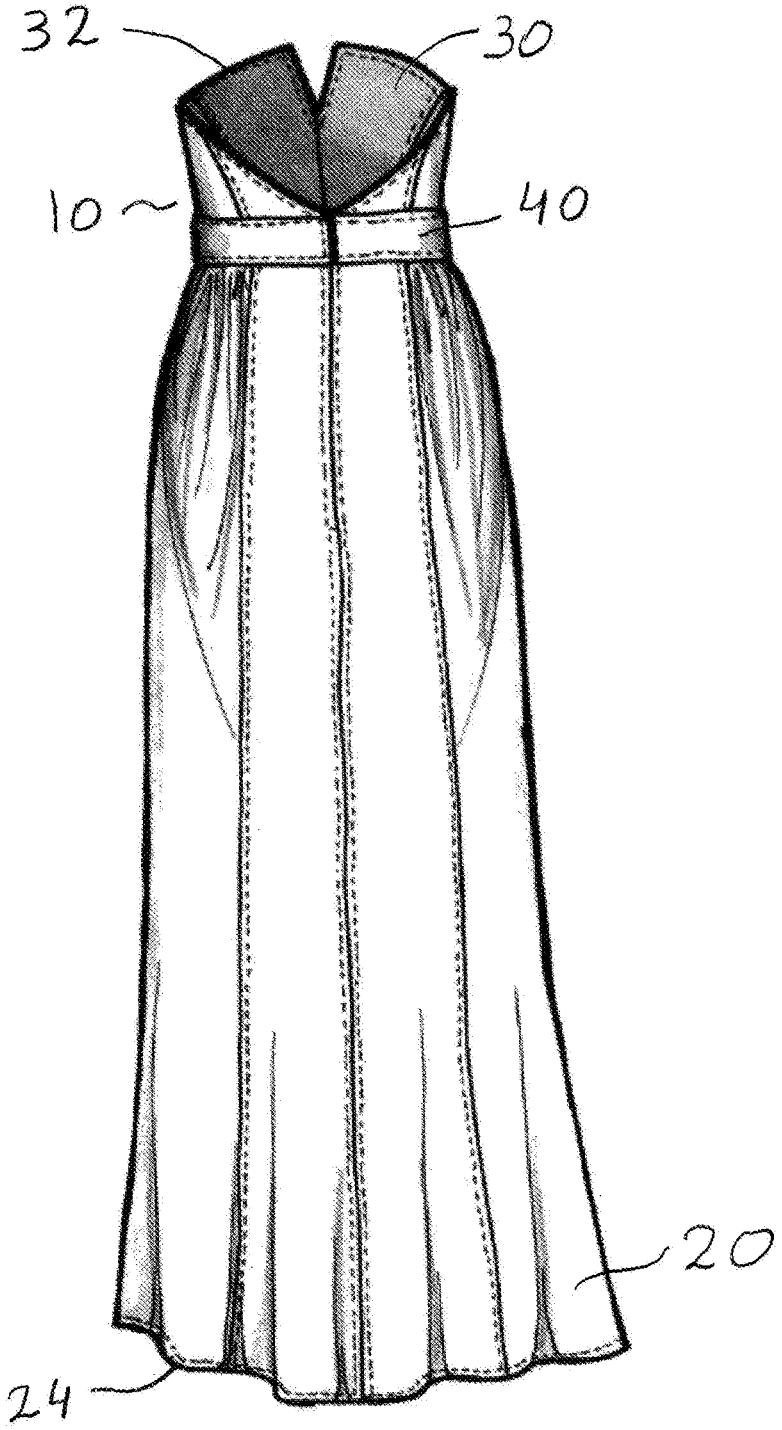
FIG. 2 is a rear view of the colored side of the long dress of FIG. 1.

With reference to the drawings, and particularly FIGS. 1-4, the long dress 10 of the present invention includes a first layer of fabric 20 and a second layer of fabric 30. The first layer of fabric 20 and the second layer of fabric 30 are preferably fabrics of different colors and/or patterns. The first layer of fabric 20 has a top end 22 and a bottom end 24, and the second layer of fabric 30 has a top end 32 and a bottom end 34. The top end 22 of the first layer of fabric 20 and the top end 32 of the second layer of fabric 30 are connected together, preferably by sewing or stitching them to one another. Together, the first layer of fabric 20 and the second layer of fabric 30 form the reversible dress 10, where the first layer of fabric 20 is preferably of a selected color or pattern, and the second layer of fabric 30 is of a different color of pattern, preferably black color. Each layer of fabric has an internal side and an external side, where the internal sides of the layers of fabric are in contact with one another, and the external sides form two visible, usable, and wearable sides of the reversible dress.

Figure 3:
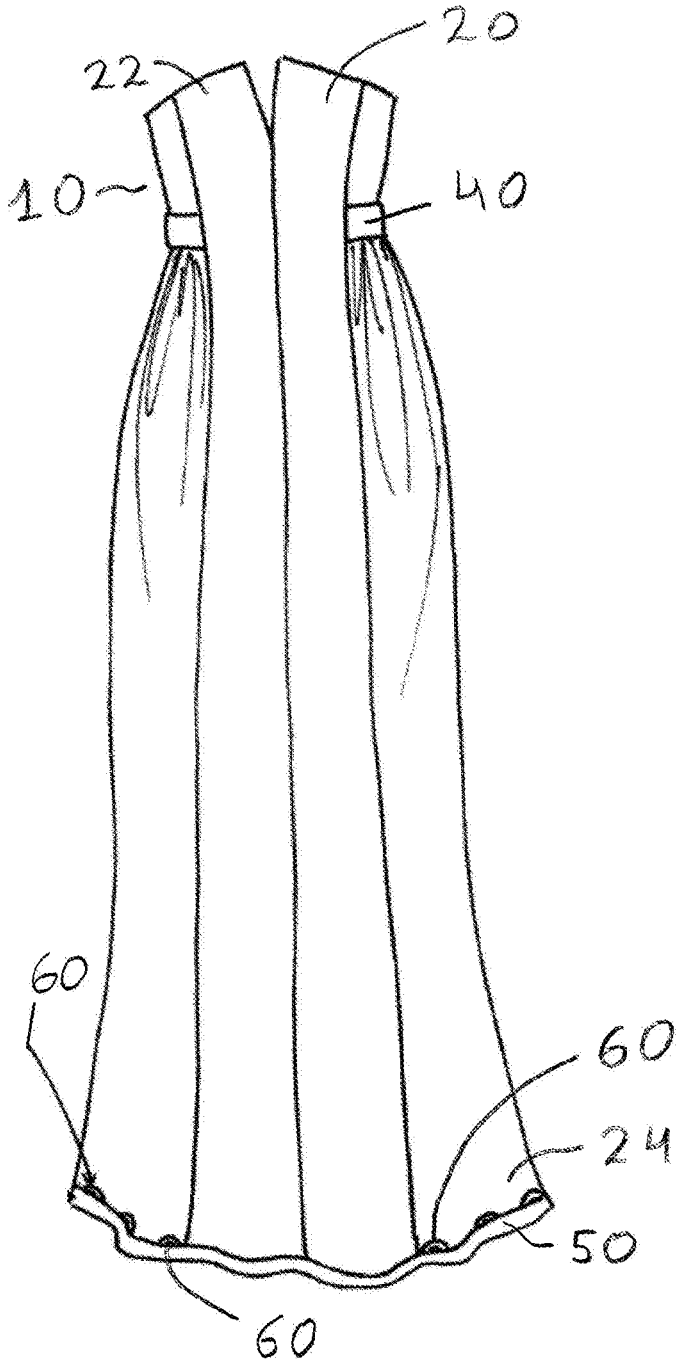
FIG. 3 is a front view of another embodiment of the colored side of the long dress of the present invention, illustrating the button loop detail along the hem.
Figure 4:
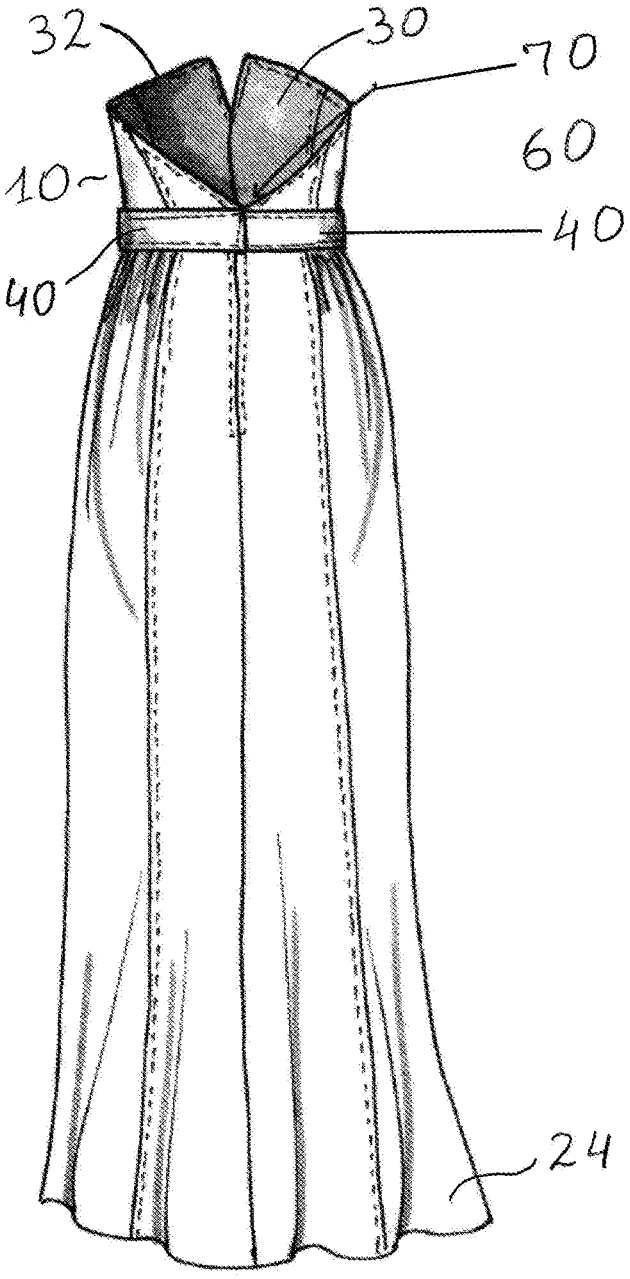
FIG. 4 is a rear view of the colored side of the long dress of FIG. 3, illustrating a reversible zipper, buttons hidden underneath the belt, and button hoops hidden at inside of the hem when the bottom of the long dress is rolled up slightly.
Figure 5:
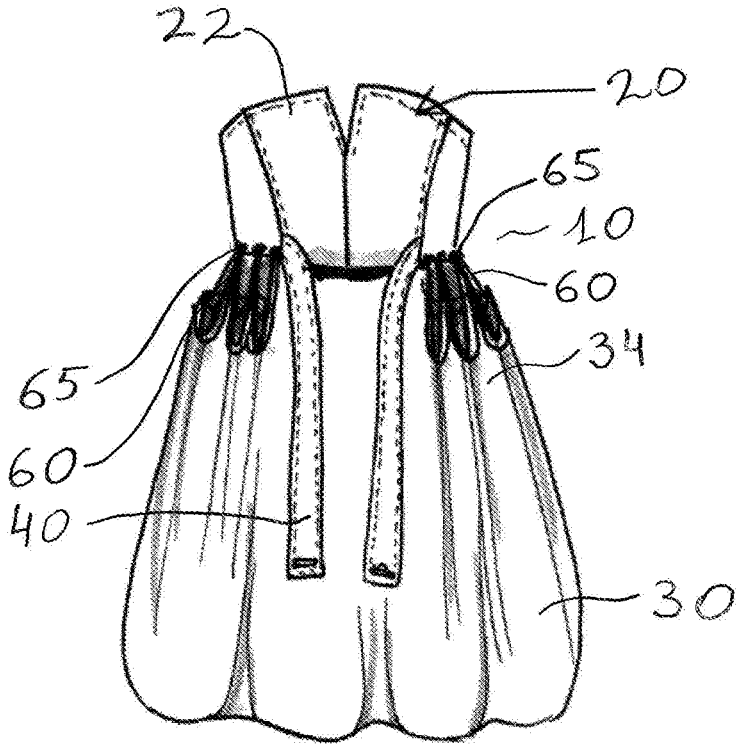
FIG. 5 is a front view of the colored side of the long dress of FIG. 1 converted into the short dress, before it is turned inside out to the reverse side.

Also with reference to the FIGS. 3-5, the button loops 60 are located along the hem (hidden at inside hem) that button up to the colored side of the dress using the buttons 65 hidden in the waistband (under the heath belt 40). The colored side of the dress is folded over to the black side hem, so that the black side is not visible when wearing the colored side of the dress. The black side of the dress is bustled/buttoned up to create a bubble skirt.

The bottom end 24 of the first layer of fabric 20 and the bottom end 34 of the second layer of fabric 30 are preferably also connected together by sewing or stitching. A hem 50 is formed on the reverse side (black side) of the reversible dress 10 by folding over the bottom end 24 of the first layer of (colored) fabric 20 onto the reverse side of the dress 10. Because of this, the length of the first layer of fabric 20 (the colored fabric) is preferably slightly longer than the length of the second layer of fabric 30.

The hem 50 along the bottom end 34 of the second (black) layer of fabric 30 does not have to be wide, but one of the purposes of the hem 50 is that the reversible dress 10 includes button loops 60 disposed along the hem 50, at the bottom end 24 of the first layer of fabric 20. Another purpose of the hem 50 is that the second layer of fabric 30 (preferably black fabric) is not visible by external observers when the long, colored side of the dress is worn.

With reference to FIG. 5, the reversible dress 10 also includes a belt 40 around the waistline area of the dress 10, and the reversible dress 10 may include fastening means 70 for securely fastening the dress 10 after it is worn. The fastening means 70 may be elastic attachments, ties or ribbons, zippers, such as a #3 reversible zipper or any reversible zipper, elastic, hook and loop fasteners, snaps, hook and bars, hook and loop, buttons, and other attachment means known in the art.

With reference to FIG. 5, the reversible dress 10 also includes cooperating attachment means at the waistband level on the colored (long) side, which attachment means are preferably buttons 65. The buttons 65 cooperatively couple with the button loops 60 when the wearer wishes to convert the long, colored dress of the present invention into a short black dress. Specifically, the buttons 65 are preferably hidden under the heath belt 40 of the reversible dress 10 when the dress 10 is worn on the colored (long) side. The attachment means may also be a snaps system, hook and eye system, hook and bars system, hook and loop system, or other attachment means known in the art.

The button loops 60 at the hem 50 on the reverse side (black side) of the dress allow the user to button up the lower half of the dress skirt to form a short bubble dress when flipped over to the other side (black side). This creates both a long colored dress and a short black dress that someone can wear. Thus, the dress 10 is completely reversible so that the user has one color dress in a long form and another color dress in the short form.

When the wearer wants to convert the long evening gown or bridesmaid dress into a short dress, the user unties the belt 40 exposing the buttons 65, and attaches each corresponding button 65 at the waistband level to its cooperating button loop 65 at the hem 50 at the bottom of the reversible dress 10 on the long (colored) side. This reduces the length of the dress' skirt by half, as measured from the waistband level. At that point, the outside observers would see the colored side of the bodice, which is the first layer of fabric 20, but the second layer of fabric 30 (the black side fabric) would be visible at the bottom since the colored side is folded up and buttoned up. The user then reverses the buttoned-up dress 10, or, in other words, flips it inside out to change colors.

Figure 6:
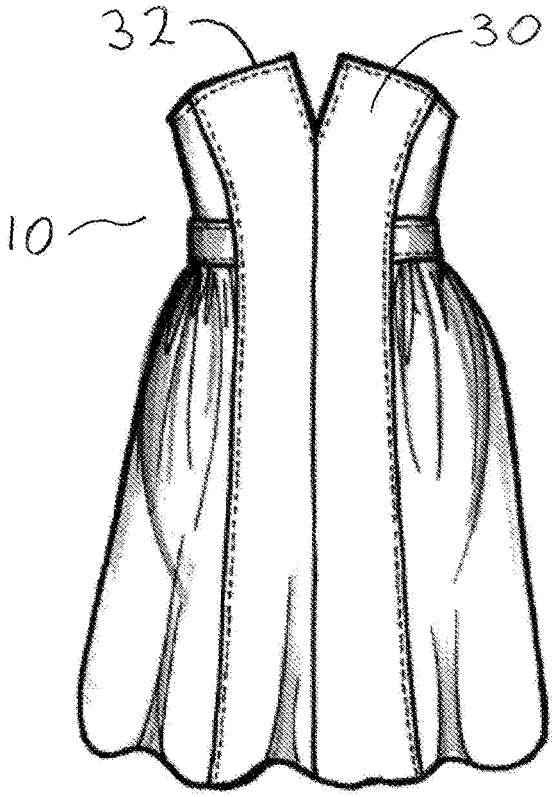
FIG. 6 is a front view of the reverse side of the long dress of FIG. 5, converted into a short dress, after it is turned inside out to the reverse side.
Figure 7:
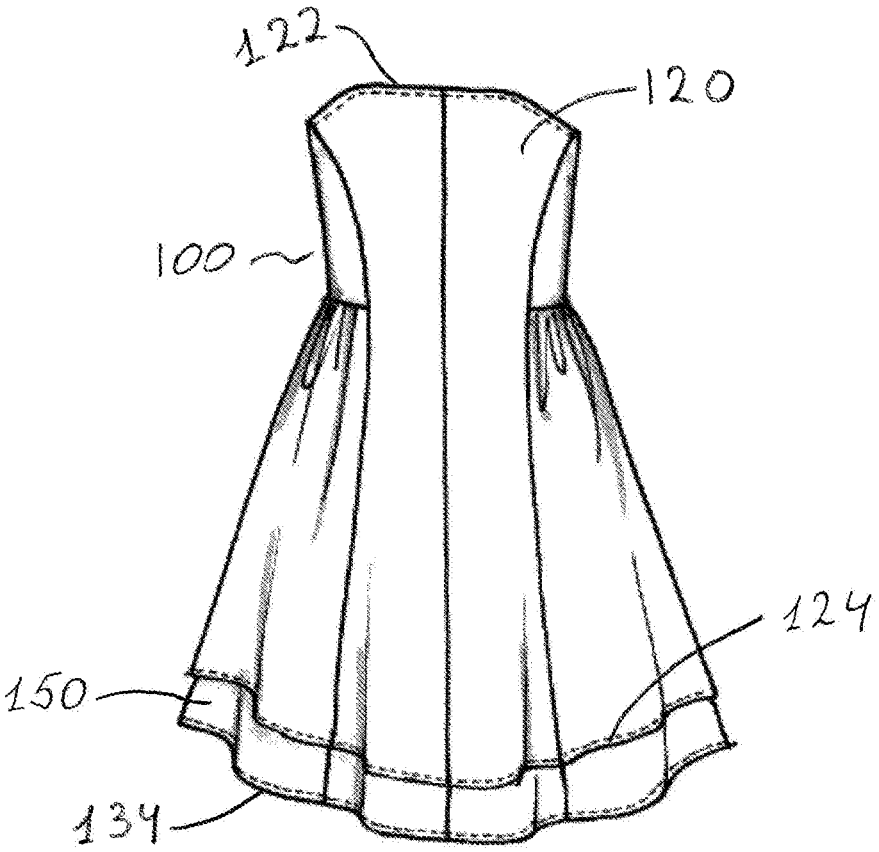
FIG. 7 is a front view of a colored side of the short dress of the present invention, illustrating the hem facing, which is in the same color as the body of the short dress.

The final result, the short black dress, is illustrated in FIGS. 6 and 7 which are the front and rear view of the reverse side of the long dress converted into a short dress, after it is turned inside out to the reverse side. The inside fabric is preferably also black fabric, which allows the reverse side of the dress to be a very utilitarian, multipurpose black dress. However, any color or pattern fabric may be used for the reversible side because it will not be seen until it is actually reversed to be worn.

As illustrated in FIG. 6, only the second layer of fabric 30 is visible, including the top end 32 of the second layer of fabric 30. The remaining elements of the reversible dress 10, including the buttons, button loops and fabric folds, are hidden from sight on the other (colored) side of the dress 10.

With reference to the drawings, and particularly FIGS. 7-10, another embodiment of the present invention is a short reversible dress 100. The short reversible dress 100 of the present invention includes a first layer of fabric 120 and a second layer of fabric 130 that is longer than the first layer of fabric 120. The first layer of fabric 120 and the second layer of fabric 130 are preferably fabrics of different colors and/or patterns. The first layer of fabric 120 has a top end 122 and a bottom end 124, and the second layer of fabric 130 has a top end 132 and a bottom end 134. The top end 122 of the first layer of fabric 120 and the top end 132 of the second layer of fabric 130 are connected together, preferably by sewing or stitching them to one another.

Together, the first layer of fabric 120 and the second layer of fabric 130 form the short reversible dress 100, where the first layer of fabric 120 is preferably of a selected color or pattern, and the second layer of fabric 130 is of a different color of pattern, preferably black color. Each layer of fabric has an internal side and an external side, where the internal sides of the layers of fabric are in contact with one another, and the external sides form two visible, usable, and wearable sides of the reversible dress.

The first layer of fabric 120 and the second layer of fabric 130 may also be attached to each other between the top end 122 and the bottom end 124 of the first layer of fabric 120 and between the top end 132 and the bottom end 134 of the second layer of fabric 130, preferably at the waistband level, and preferably also attached together by sewing or stitching.

The difference in lengths between the first layer of fabric 120 and the second layer of fabric 130, where the second layer of fabric 130 is longer than the first layer of fabric 120, creates a layered or two-tier look because the first layer of fabric 120 is shorter. The difference is filled in by hem facing 150 that uses the same color or pattern fabric as the first layer of fabric 120.

Figure 11:
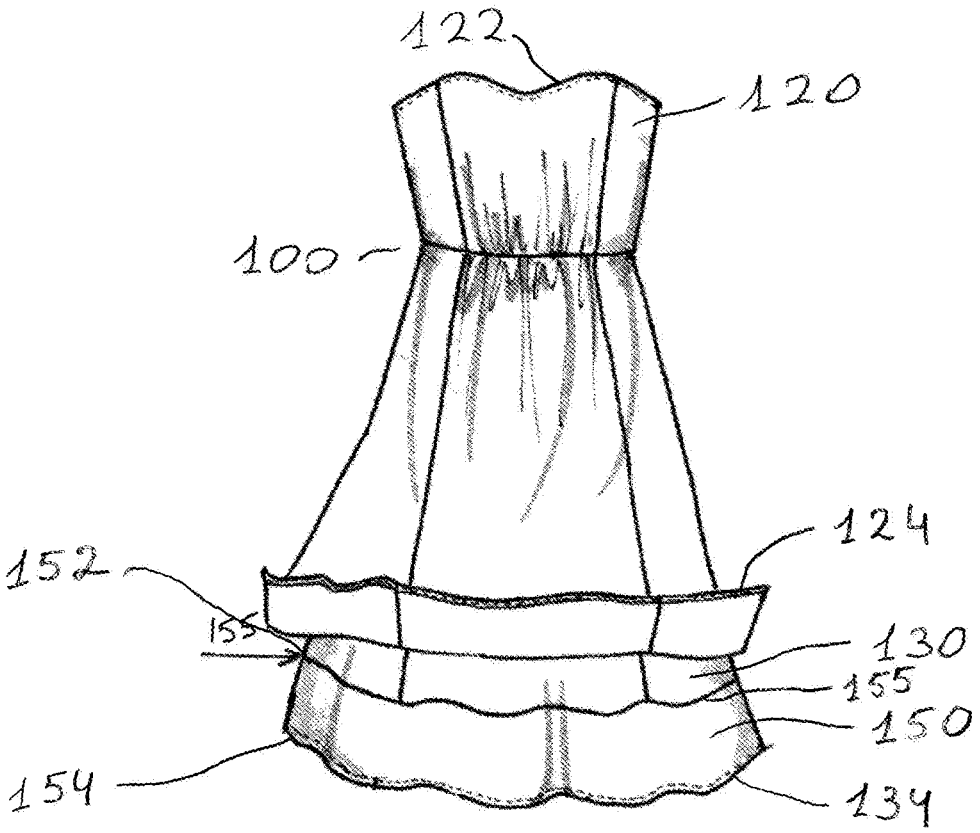
FIG. 11 is a front view of a colored side of another embodiment of the short dress of the present invention, illustrating a blind stitch 155 hem facing.

With reference to FIG. 11, the hem facing 150 has a top hem end 152 and a bottom hem end 154. The bottom hem end 154 of the hem facing 150 is attached to the bottom end 134 of the second layer of fabric 130 on the front side (black side) of the reversible dress 100. The top hem end 152 is attached to the second layer of fabric 130 so that the top hem end 152 is on the same level, or preferably above, the bottom end 124 of the first layer of fabric 120. The top hem end 152 is preferably attached to the second layer of fabric 130 by a blind stitch 155. Having the hem facing 150 of the same color as the first layer of fabric 120, with the bottom hem end 154 being aligned with the bottom end 134 of the second layer of fabric 130, and with the top hem end 152 being on the same level or above the bottom end 124 of the first layer of fabric 120, the bottom part of the second layer of fabric 130 is completely covered by the hem facing 150 of the same color or pattern as the first layer of fabric 120.

Figure 12:
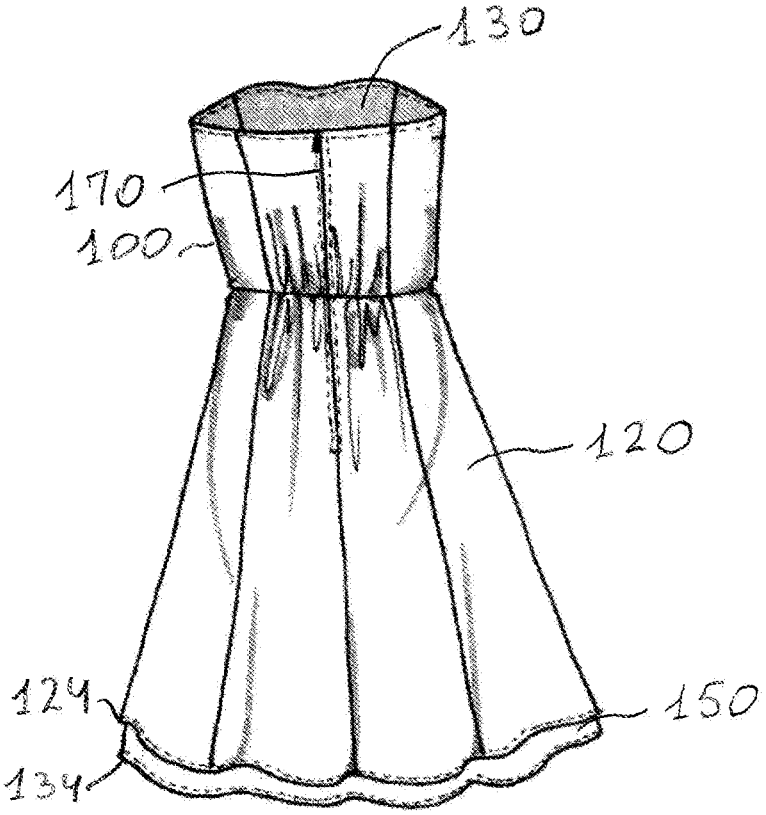
FIG. 12 is a rear view of the colored side of the short dress of FIG. 11, using a reversible zipper.

With reference to FIGS. 11-12, the hem facing 150 is preferably stitched using the blind stitch 155 to make sure that the inside color does not show through the bottom of the dress. This process also makes the hem feasible to make using the production method. Without this feature, the factory cannot quickly hem the garment without the other side showing at the bottom (the hem becomes uneven). Currently, no one has created a reversible short dress where the manufacturer can make sure that the hem does not have bits of the other color peeking through. The hen becomes uneven and difficult to sew for the factory without the hem facing 150.

The result is such that the inside color (typically black) is not visible at the bottom because of the hem facing 150, so the inside (reverse side) color does not show through the hem facing 150 at the bottom. Thus, the second layer of fabric 130 (preferably black fabric) is not visible by external observers when the colored side of the dress 100 is worn because it is covered by the hem facing 150. This method also makes the hem facing 150 feasible in production: without this kind of hem facing, a factory cannot quickly hem the garment without the reverse side color showing at the bottom (the hem becomes uneven and the color peeks out).

Figure 8:
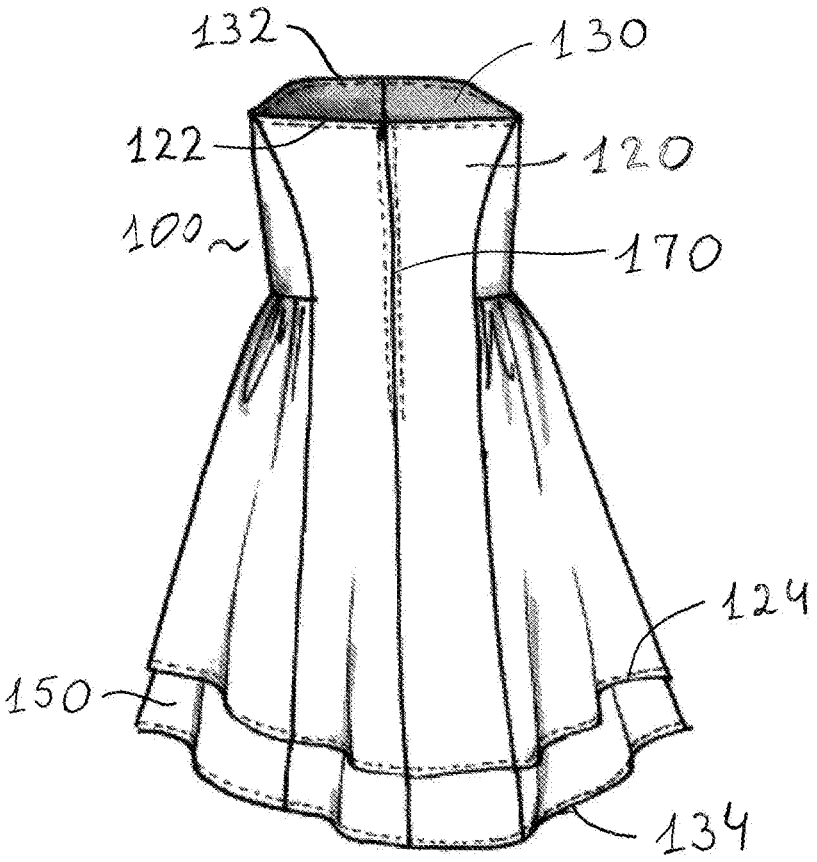
FIG. 8 is a rear view of the colored side of the short dress of FIG. 7.

As illustrated in FIG. 8 and FIG. 12, the difference between the lengths of the first layer of fabric 120 and the second layer of fabric 130 and the corresponding width of the hem facing 150 determine the overall look of the dress 100 on the colored side (i.e., the layered or two-tiered look).

With referenced to FIG. 12, the reversible short dress 100 may include fastening means 170 for securely fastening the dress 100 after it is worn. The fastening means 170 may be elastic attachments, zippers, such as a #3 reversible zipper or any reversible zipper, elastic, hook and loop fasteners, snaps, hook and bars, and other attachment means known in the art. The short reversible dress 100 may also include a belt (not shown) around the waistline area of the dress 100.

Thus, the short dress 100 is completely reversible so that the user has one color dress in a colored form and another dress in the short form.

When the wearer wants to convert the short colored dress 100 into a short black dress, the user just need to flip the dress 100 inside out to change colors. The inside fabric is preferably black fabric, which allows the reverse side of the dress 100 to be a very utilitarian, multi-purpose, short black dress. However, any color or pattern fabric may be used for the reversible side because it will not be seen until it is actually reversed to be worn.

Figure 9:
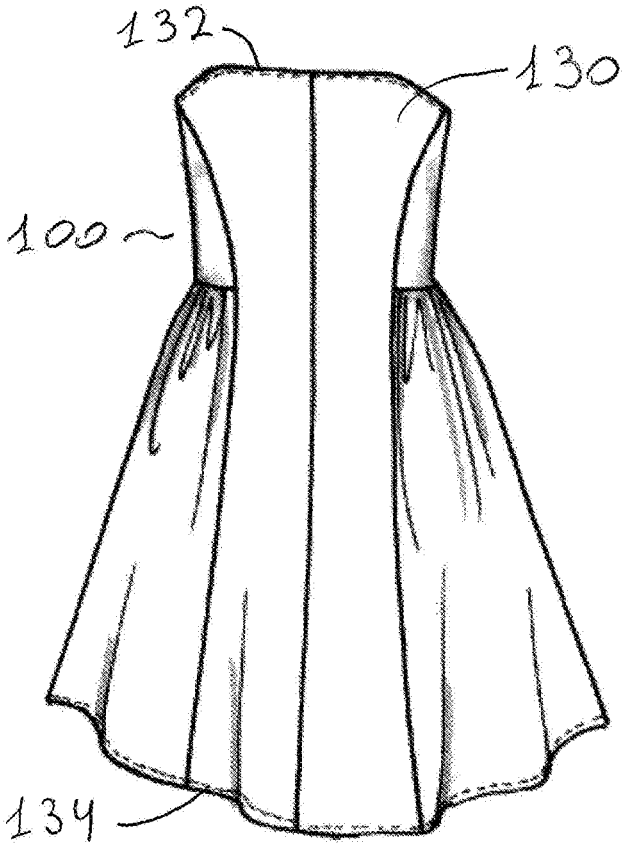
FIG. 9 is a front view of the reverse side of the short dress of FIG. 7.
Figure 10:
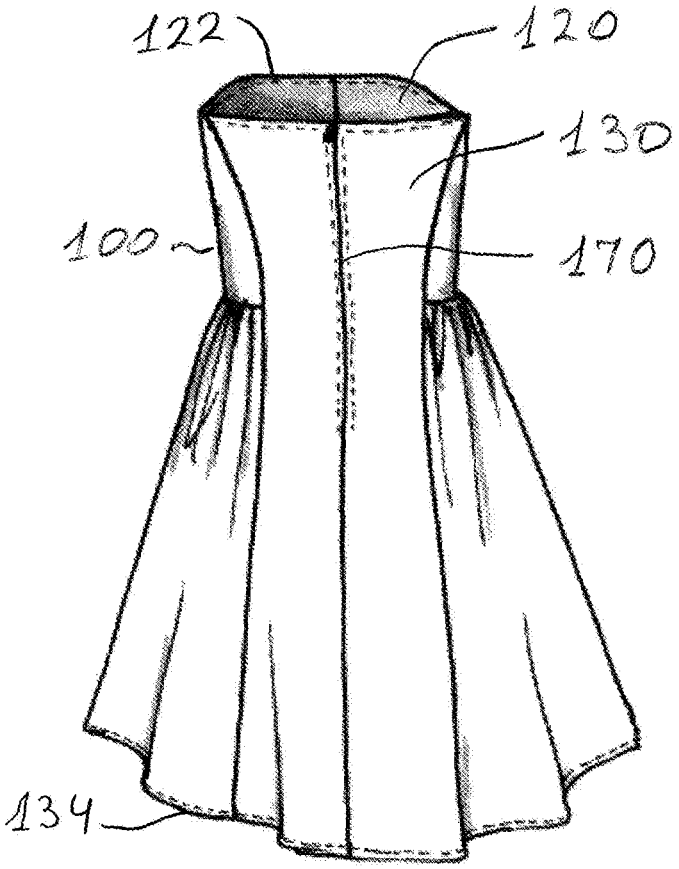
FIG. 10 is a rear view of the reverse side of the short dress of FIG. 7.

The final result, the short black dress, is illustrated in FIGS. 9 and 10 which are the front and rear view of the reverse side of the short dress converted into a short black dress, after it is turned inside out to the reverse side. Only the second layer of fabric 130 is visible, including the top end 132 and the bottom end 134 of the second layer of fabric 130. The remaining (color) elements of the reversible dress 100, including the two-tier look, are hidden from sight on the other (colored) side of the dress 100.

The inside fabric is preferably black fabric, which allows the reverse side of the dress to be a very utilitarian, multi-purpose black dress. However, any color or pattern fabric may be used for the reversible side because it will not be seen until it is actually reversed to be worn. Various integral or removable belts, back straps and other retaining means may be used with the reversible dress of the present invention.

The present invention is a dress that is lovely, makes a statement, and is a practical investment. The present invention is a two-in-one dress that gives the user the versatility to transform from a demure bridesmaid (or attendee of other black tie occasions) to a diva in a chic "little black dress."

The above description of the disclosed preferred embodiments of the present invention is provided to enable any person skilled in the art to make or use the invention. Various modifications to and variations of these embodiments will be readily apparent to those skilled in the art, and the principles described herein can be applied to other embodiments without departing from the spirit or scope of the invention and the subject matter of the present invention, which is broadly contemplated by the Applicant. The scope of the present invention fully encompasses other embodiments that may be or become obvious to those skilled in the art.

The invention claimed is:

1. A reversible dress comprising:

a. a first layer of fabric having a first length, a first top end, a first bottom end, a first external side and a first internal side;

b. a second layer of fabric having a second length longer than the first length, a second bottom end, a second top end attached to the first top end, thereby defining a distance between the first bottom end and the second bottom end, a second external side, and a second internal side in operative contact with the first internal side; and c. a hem facing having a bottom hem end attached to the second bottom end on the second internal side and having a top hem end attached to the second internal side between the first bottom end and the first top end, wherein the size of the hem facing is selected so that the hem facing covers the second layer of fabric between the first bottom end and the second bottom end.

2. A reversible dress as in claim 1, wherein the size of the hem facing is determined by the distance between the first bottom end and the second bottom end.

3. A reversible dress as in claim 1, wherein the first external side of the first layer of fabric is patterned or colored.

4. A reversible dress as in claim 1, wherein the second external side of the second layer of fabric is black.

5. A reversible dress as in claim 1, wherein the second external side of the second layer of fabric has a different color, pattern or texture than the first external side of the first layer of fabric.

6. A reversible dress as in claim 1, wherein the hem facing has the same color or pattern as the first external side of the first layer of fabric.

7. A reversible dress as in claim 1, wherein the size of the hem facing is selected to cover the distance between the first bottom end and the second bottom end.

8. A reversible dress as in claim 1, wherein the size of the hem facing is selected to completely cover the distance between the first bottom end and the second bottom end.

9. A reversible dress as in claim 1, further comprising fastening means operatively coupled to the first layer of fabric and the second layer of fabric so as to enable a wearer to fasten the dress.

10. A method of manufacturing a reversible dress, comprising:

a. providing a first layer of fabric having a first length, a first top end, a first bottom end, a first external side, and a first internal side;

b. providing a second layer of fabric having a second length longer than the first length, a second bottom end, a second top end attached to the first top end, thereby defining a distance between the first bottom end and the second bottom end, a second external side, and a second internal side in operative contact with the first internal side; and c. operatively connecting a hem facing having a bottom hem end attached to the second bottom end on the second internal side and having a top hem end attached to the second internal side between the first bottom end and the first top end, wherein the size of the hem facing is selected so that the hem facing covers the second layer of fabric between the first bottom end and the second bottom end.

* * * * *